(12) United States Patent
Kaufmann et al.

(10) Patent No.: US 9,457,307 B2
(45) Date of Patent: Oct. 4, 2016

(54) FILTER SYSTEM WITH FILTER ELEMENT

(71) Applicant: MANN+HUMMEL GMBH, Ludwigsburg (DE)

(72) Inventors: Michael Kaufmann, Meckenheim (DE); Klaus-Dieter Ruhland, Meckenheim (DE); Imre Marton, Harthausen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 89 days.

(21) Appl. No.: 14/474,227

(22) Filed: Sep. 1, 2014

(65) Prior Publication Data
US 2015/0059301 A1 Mar. 5, 2015

Related U.S. Application Data

(60) Provisional application No. 62/038,312, filed on Aug. 17, 2014, provisional application No. 62/038,575, filed on Aug. 18, 2014, provisional application No. 62/038,601, filed on Aug. 18, 2014, provisional
(Continued)

(30) Foreign Application Priority Data

| Sep. 2, 2013 | (DE) | 10 2013 014 488 |
| Sep. 2, 2013 | (DE) | 10 2013 014 489 |
| Sep. 2, 2013 | (DE) | 10 2013 014 491 |
| Sep. 2, 2013 | (DE) | 10 2013 014 492 |
| Sep. 2, 2013 | (DE) | 10 2013 014 493 |
| Sep. 2, 2013 | (DE) | 10 2013 014 507 |

(51) Int. Cl.
*B01D 46/24* (2006.01)
*B01D 46/52* (2006.01)
(Continued)

(52) U.S. Cl.
CPC ....... *B01D 46/2411* (2013.01); *B01D 46/0001* (2013.01); *B01D 46/0002* (2013.01); *B01D 46/0004* (2013.01); *B01D 46/0021* (2013.01); *B01D 46/0027* (2013.01);
(Continued)

(58) Field of Classification Search
CPC .......... B01D 46/0021; B01D 46/2411; B01D 46/2414; B01D 46/521; B01D 46/522
See application file for complete search history.

(56) References Cited

U.S. PATENT DOCUMENTS 5,128,039 A * 7/1992 Gabrielson ........... B01D 29/111
210/450
5,522,909 A 6/1996 Haggard
(Continued)

FOREIGN PATENT DOCUMENTS

| DE | 19849998 A1 | 5/2000 |
| DE | 102008062954 A1 | 7/2010 |

(Continued)

*Primary Examiner* — Robert Clemente
(74) *Attorney, Agent, or Firm* — James Hasselbeck

(57) ABSTRACT

A filter system is provided with a housing having a housing wall and a cover, the housing having a longitudinal axis. An inlet is arranged on the housing and feeds a fluid to be filtered into the housing. An outlet is arranged on the housing and discharges the filtered fluid. Filter elements each having at least one filter medium are arranged in the housing. At least one of the filter elements extends along the longitudinal axis. The filter medium has pleats extending along the longitudinal axis with outer and inner pleat edges. The outer pleat edges extend on the first side of the filter medium and the inner pleat edges on the second side of the filter medium and are opposite the outer pleat edges. The filter medium has a variable flow resistance along the longitudinal axis.

19 Claims, 8 Drawing Sheets

Related U.S. Application Data application No. 62/038,920, filed on Aug. 19, 2014, provisional application No. 62/038,672, filed on Aug. 18, 2014, provisional application No. 62/038,869, filed on Aug. 19, 2014.

(51) Int. Cl.
*B01D 46/00* (2006.01)
*F02M 35/024* (2006.01)
*F02M 35/02* (2006.01)
*F02M 35/022* (2006.01)
*F02M 35/09* (2006.01)

(52) U.S. Cl.
CPC ..... *B01D 46/0046* (2013.01); *B01D 46/0086* (2013.01); *B01D 46/2414* (2013.01); *B01D 46/521* (2013.01); *B01D 46/522* (2013.01); *F02M 35/0203* (2013.01); *F02M 35/024* (2013.01); *F02M 35/0216* (2013.01); *F02M 35/0223* (2013.01); *F02M 35/02416* (2013.01); *F02M 35/02483* (2013.01); *F02M 35/09* (2013.01); *Y10T 29/49826* (2015.01)

(56) References Cited

U.S. PATENT DOCUMENTS

| | | | |
|---|---|---|---|
| 8,852,309 B2 | 10/2014 | Scott et al. | |
| 2009/0301042 A1* | 12/2009 | Troxell | B01D 46/2411 55/330 |
| 2012/0055127 A1* | 3/2012 | Holzmann | B01D 46/0001 55/484 |
| 2012/0266578 A1* | 10/2012 | Gorg | F02M 35/02425 55/492 |
| 2013/0062276 A1 | 3/2013 | Barreteau | |
| 2014/0144111 A1 | 5/2014 | Campbell | |
| 2015/0107201 A1* | 4/2015 | Cornaglia | B01D 46/125 55/484 |

FOREIGN PATENT DOCUMENTS

| | | |
|---|---|---|
| EP | 1128891 B1 | 2/2003 |
| EP | 1558360 B1 | 5/2007 |

\* cited by examiner

FILTER SYSTEM WITH FILTER ELEMENT

CROSS-REFERENCE TO RELATED APPLICATIONS

This application claims the benefit of German patent application Nos. 10 2013 014 488.4, filed Sep. 2, 2013; 10 2013 014 489.2, filed Sep. 2, 2013; 10 2013 014 507.4, filed Sep. 2, 2013; 10 2013 014 492.2, filed Sep. 2, 2013; 10 2013 014 491.4, filed Sep. 2, 2013; and 10 2013 014 493.0, filed Sep. 2, 2013. The entire contents of the aforesaid German patent applications being incorporated herein by reference and to the fullest extent of the law.

This application claims the benefit of US provisional patent application Nos. 62/038,312, filed: Aug. 17, 2014; 62/038,575, filed: Aug. 18, 2014; 62/038,601, filed: Aug. 18, 2014; 62/038,920, filed: Aug. 19, 2014; 62/038,672, filed: Aug. 18, 2014 and 62/038,869, filed Aug. 19, 2014. The entire contents of the aforesaid provisional patent applications being incorporated herein by reference and to the fullest extent of the law.

BACKGROUND OF THE INVENTION

The invention relates to a filter system having a filter element, in particular for use as an air filter of an internal combustion engine, and a filter element for fitting in such a filter system.

The structure of filter systems in which round filter elements are used is known from the prior art. In use, flow through the round filter elements frequently takes place from the outside to the inside, wherein the filtered fluid is fed out of the cylindrical inner chamber through an opening in the cover or bottom of the round filter element to the output of the filter housing. The diameter of the output opening in the cover of the round filter element is limited by the diameter of the inner chamber of the filter element. This is given by the diameter of the filter element minus the pleat height of the filter medium used.

On the one hand, a greatest possible pleat height allows for a large effective filter area of the filter element with constant external dimensions. On the other hand, the output opening for the filtered fluid must have an adequate cross section to be able to discharge the fluid. With specified dimensions of the filter element, a choice must therefore be made between these two design influences and a compromise must be found.

Conically shaped filter elements, which, however, have a larger installation space requirement due to the conical shape, which opens with a certain angle in the opposite direction to the outlet direction of the filter system, are disclosed in EP 1558360 B1. Pleated secondary elements, which, however, take up additional installation space compared with secondary elements with smooth filter media, are also known.

An object of the invention is therefore to design a compact filter system having at least one replaceable filter element made of a filter medium in such a way that a highest possible separation rate for dust particles can be achieved with favorable installation space.

A further object of the invention is to create a filter element for fitting in such a filter system, with which a highest possible separation rate for dust particles can be achieved with favorable installation space.

SUMMARY OF THE INVENTION

According to the invention, the above-mentioned objects are solved by a filter system having one or more filter elements equipped with at least one filter medium, wherein the filter medium is pleated in a zigzag shape and has a plurality of outer pleat edges extending along a longitudinal axis and inner pleat edges which lie opposite the outer pleat edges on the opposite side of the filter medium, and wherein the filter medium has a variable flow resistance along the longitudinal axis.

Further embodiments and advantages of the invention can be taken from the further claims, the description, and the drawing.

A filter system having one or more filter elements equipped with a filter medium is proposed, wherein at least one filter element extends along a longitudinal axis, wherein the filter system comprises a housing with housing wall and a cover, wherein an inlet for feeding in a fluid to be filtered, in particular air, and an outlet for discharging the filtered fluid are arranged on the housing, wherein the filter medium is pleated in a zigzag shape and has a plurality of outer pleat edges extending along the longitudinal axis and inner pleat edges which lie opposite the outer pleat edges on the opposite side of the filter medium, and wherein the filter medium has a variable flow resistance along the longitudinal axis. The varying flow resistance along the longitudinal axis brings about a particularly effective separation of particles, in particular dust particles, from the fluid, such as air, to be filtered. Different advantageous embodiments of the filter medium are possible here.

In a preferred embodiment, the cover of the housing can be arranged on a face side of the housing and therefore be constructed concentrically about the longitudinal axis, while the inlet can be arranged in the housing wall or in the cover. The outlet can furthermore be arranged concentrically with the longitudinal axis in order to be able to incorporate the filter system in a particularly installation-space-saving manner.

In a preferred embodiment of the so-called pleated filter medium, i.e. folded in a zigzag shape, in particular star-pleated filter medium, the fluid to be filtered can flow to the outer pleat edges of the filter medium in such a way that the deposited dirt particles remain on the outside of the filter medium; however, other flow conditions may also be advantageous. A star-pleated filter medium is closed in itself, e.g. has an annular or angular cross section. Flow through the filter medium can therefore take place from the outside to the inside or vice versa.

On the one hand, the outer pleat edges of the pleats can lie on an envelope surface of a cylinder and the inner pleat edges at least partially on the envelope surface of a cone. This has the advantage that the outer structure of the filter element, and therefore of the filter system, can be cylindrical, which can be useful for a range of applications where little installation space is available. The cylindrical envelope surface is characterized in that it has the same radius along the longitudinal axis, i.e., straight walls. On the other hand, the conical envelope surface exhibits a change in radius along the longitudinal axis, i.e., a conical form, wherein, in the embodiment according to the invention, an apex angle of the cone can lie in the range from 1° to typically 10°, preferably between 1° and 5°.

A pleating of the filter medium, in which at least one edge of the pleats lies on the envelope surface of a cone, is referred to below as semi-conical pleating.

In general, although a cylindrical structure of the filter system is very widespread and expedient for fitting in installation spaces of internal combustion engines, the outside dimensions can also have angular or flat forms, which can therefore also result in angular and/or flat envelope surfaces for the outer pleat edges of pleats of the filter medium.

On the other hand, the outer pleat edges of the pleats can lie at least partially on the envelope surface of a cone and the inner pleat edges on an envelope surface of a cylinder. This enables cylindrical supporting elements to be used in the interior of the filter element as a stiffening means for the filter element.

Further, in another embodiment, both the outer pleat edges and the inner pleat edges of the pleats can lie at least partially on the envelope surface of a cone. This enables particularly installation-space-saving structures of filter elements to be realized.

With round air filters, so-called star-pleated filter elements with straight pleats in cylindrical or conical design are known from the prior art. Secondary elements, i.e., filter elements which are used in the interior of the actual filter elements to safeguard the filtered air region against contamination when changing filter elements, encased with fleece material, again also in cylindrical or conical design, are also state of the art. The use of semi-conical pleating as described above is particularly advantageous in two-stage air filters with cyclone separators, with or without downstream secondary element, in cylindrical or conical design, as in this way a particularly effective particle separation is possible with particularly low installation space requirement.

Further advantages lie in a better routing of air with possible larger cross sections, for example in the region of the filtered air outlet, which enables the pressure loss of the whole air filter to be reduced. In addition, the specific dust loading, i.e., the dust mass per filter area, at the actual filter element is better, which leads to longer service lives of the filter element in spite of having the same installation space.

Advantageously, a cyclone separator can be provided in the region of the inlet of the filter system (two-stage air filter system) and a dirt outlet can be provided on the housing or on the cover. This cyclone separator consists of a routing geometry which causes the fluid to be filtered to rotate. As a result of this rotation, the dirt is concentrated in the region of the housing wall and discharged at a suitable point via a dirt outlet. The pre-separation of the majority of dirt from the air to be filtered enables the service life of the actual filter element to be decisively increased.

Expediently, in an advantageous embodiment, a pleat height of the pleats can change continuously along the longitudinal axis. In this way, an effective production of the semi-conically pleated structure of the filter medium according to the invention is enabled in a particularly favorable manner. Further, this enables the flow resistance to be continuously adjusted along the longitudinal axis to favorably influence the separation rate of the particles.

In an advantageous compact structure of a filter system according to the invention, one of two or more filter elements can be arranged in the interior of another of the filter elements. Such a two-stage filter system is of great advantage, particularly for use under demanding conditions such as large accumulations of dust, for example, in the construction and agricultural machinery sector, as the inner filter element can effectively protect the filtered air outlet against contamination when changing the outer filter element.

Advantageously, a cone of the inner and/or outer pleat edges of one of the one or more filter elements can open along the longitudinal axis in the same direction as a cone of the inner and/or outer pleat edges of another of the one or more filter elements. In this way, the flow routing of the fluid to be filtered and therefore the pressure loss of the filter system can be decisively optimized.

Another advantageous embodiment comprises a cone of the inner and/or outer pleat edges of one of the one or more filter elements being open along the longitudinal axis in the opposite direction to a cone of the inner and/or outer pleat edges of another of the one or more filter elements. This particularly compact structure of the filter system enables a particularly large internal free cross section with compact external dimensions of the filter system.

According to a further embodiment of the invention, a secondary element can be arranged in the interior of the filter element. The secondary element, which can consist of a supporting structure which is covered with a permeable filter medium, for example, a fleece, has the task of continuing to keep the outlet of the filter system closed when the filter element is changed so that no dirt can penetrate this region while the filter element is being cleaned or replaced. Such a filter system is of great advantage, particularly for use under demanding conditions such as large accumulations of dust, for example in the construction and agricultural machinery sector, as the secondary element can effectively protect the filtered air outlet against contamination when changing the outer filter element. In a preferred embodiment, the secondary element can be connected to the housing by means of a screw connection and provided with a seal with respect to the housing.

Advantageously, a supporting tube can be arranged in the interior of the secondary element. By means of the supporting tube, an inherently unstable filter element, and also a secondary element, can be stiffened in order to retain the original shape against flow pressure as well as mechanical vibration in operation on an internal combustion engine, and to continue to reliably perform the intended function.

In an alternative embodiment, a filter medium of the secondary element can consist of a fleece. Expediently, such a fleece can be placed over a supporting tube or, for example, pulled over it like a sock. A filter medium in the form of fleece requires only a particularly small installation space.

Alternatively, a simple star-pleated filter bellows in conical form, which is matched to the inner side of the filter element and which preferably has a constant pleat height which is small compared with the filter element, for example, less than or equal to 10 mm, preferably less than or equal to 5 mm, can be used instead of a fleece for the secondary element. In this way, the pressure loss can be reduced compared with a fleece.

In another embodiment, the secondary element can be connected to the housing and remain in the housing when changing the filter element. As a result, the filtered air outlet is particularly effectively protected against contamination when changing the filter element. The fixed attachment of the secondary element to the housing can also benefit the production of a particularly cost-effective embodiment of the filter system.

If the secondary element is not permanently connected to the housing but is designed to be replaceable, then an end disk of the secondary element can be formed as a handle for better assembly/disassembly.

Expediently, at least one of the one or more filter elements can be arranged in the housing of the filter system in a replaceable manner. Especially when using a filter system under particularly harsh environmental conditions, filter elements can become so loaded with dust that they have to be changed at relatively short time intervals and, of course, the whole filter system should not have to be replaced every time, which would lead to considerably more outlay in terms of operating costs.

Use of a filter system as an air filter, in particular as an air filter of an internal combustion engine, can be advantageous.

Use of a filter system as a particle filter, in particular as a particle filter of an internal combustion engine, can also be advantageous.

According to a further aspect, the invention relates to a filter element for use in a filter system, wherein a filter medium is pleated in a zigzag shape and has a plurality of outer pleat edges extending along the longitudinal axis and inner pleat edges of pleats which lie opposite the outer pleat edges on the opposite side of the filter medium, wherein the filter medium has a variable flow resistance along the longitudinal axis, and wherein the filter element can be arranged in the housing of the filter system in a replaceable manner. Here, the essential advantage of such a filter system lies in the secure and stable assembly of the filter element and a very economic replaceability of the filter element in the event of service. The rapid replaceability is of great importance, particularly in the case of short service lives, encountered when used in agricultural and construction machinery.

In a favorable embodiment, the filter medium can consist, for example, of a filter bellows which is folded (pleated) in a zigzag shape, and be designed to be closed in an annular shape. The pleating can be produced, for example, by knife pleating, for longer filter bodies, or rotation pleating. The filter bellows can consist, for example, of paper or of cellulose or of a mixed fiber made of plastic and cellulose. Further, the filter bellows can be designed with smooth surface, a surface which is rolled and/or formed in different embossed shapes for stiffening and/or creating hollow spaces for dust accumulation. The filter bellows can have a coating and/or impregnation to repel moisture. Alternatively, it can also be coated with so-called nano fibers. Furthermore, the filter body can be structurally stiffened with a yarn winding. Here, a yarn is wound around the circumference of the filter body. A plurality of yarn windings can also be provided at different axial heights of the filter body. The use of these materials as a filter medium constitutes a very economic way of realizing such a filter element. At the same time, the form described offers a stable arrangement, thus resulting in a self-supporting structure of the filter body and therefore a favorable assembly characteristic.

BRIEF DESCRIPTION OF THE DRAWINGS

Further advantages can be seen from the following description of the drawings. Exemplary embodiments of the invention are shown in the drawings. The drawings, the description and the claims contain numerous characteristics in combination. Expediently, a person skilled in the art will also consider the characteristics individually and combine them to form other meaningful combinations.

DESCRIPTION OF PREFERRED EMBODIMENTS

In the figures, identical or similar components are numbered with the same references. The figures show only examples and are not to be considered to be limiting.

Figure 1:
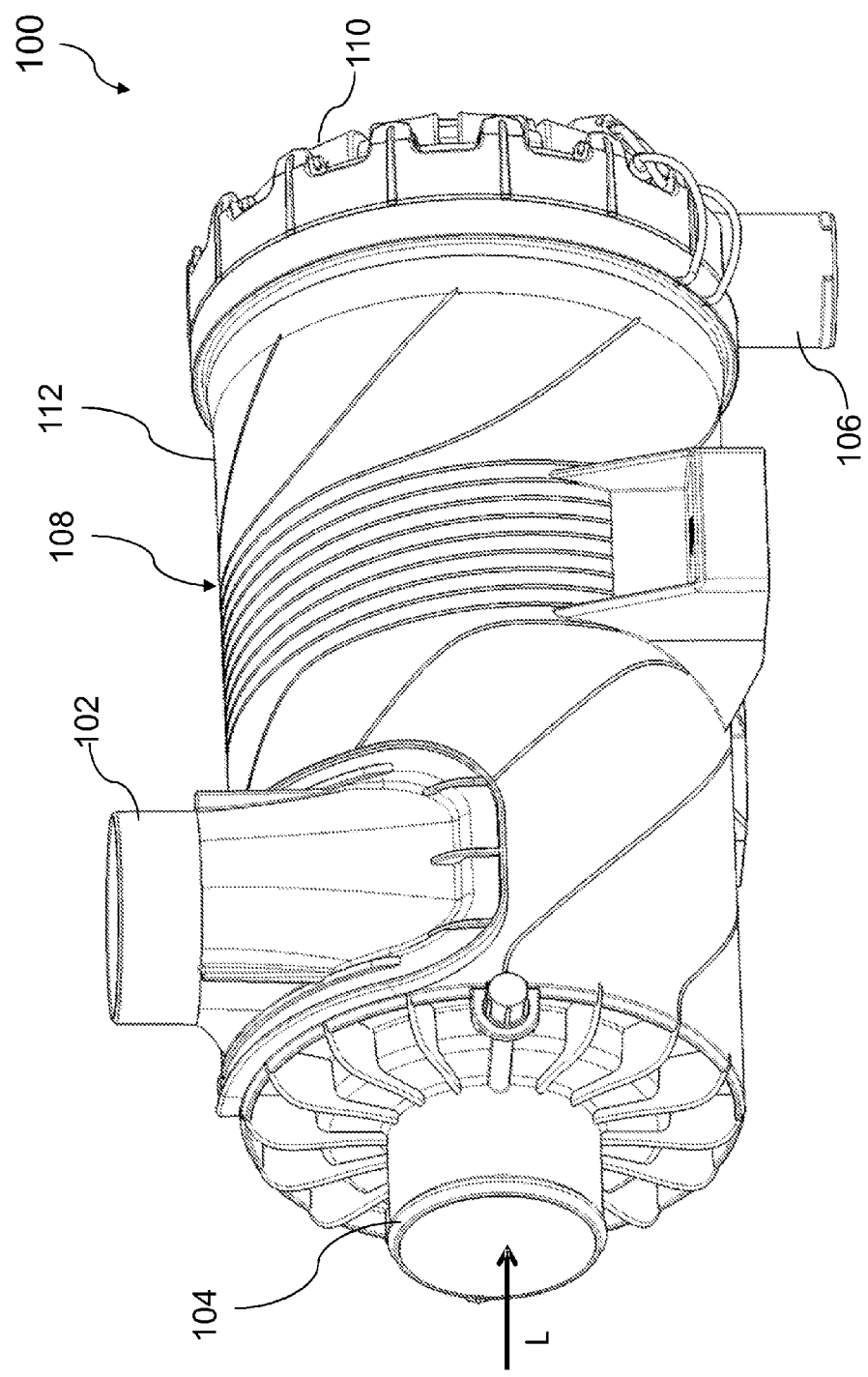
FIG. 1 shows a perspective view of a two-stage filter system with a cyclone separator according to an exemplary embodiment of the invention.

FIG. 1 shows a perspective view of a two-stage filter system 100 with a cyclone separator 36 according to an exemplary embodiment of the invention with tangential inlet 102, centric outlet 104 on a housing face side and bottom dirt outlet 106. Shown is a round filter structure which consists of a housing 108 which has a housing wall 112 and is closed by means of a cover 110, for example with screw or bayonet closure. When used as an air filter system, dust-laden air flows into the inlet 102, which is arranged tangentially to the internally fitted air filter element, so that the air in the interior of the housing 108 is set into a rotational movement by an incident flow protector on the filter element. Filter element and incident flow protector are not shown in the drawing. Due to the cyclone effect caused by the rotational movement of the air, centrifugal forces act on the dust particles of the flowing air so that they are partially separated on the housing wall and can flow out of the filter system 100 via the dirt outlet 106. As a result, the filter element is not so heavily loaded and the service life of the filter element is increased. The cleaned air can be discharged from the housing 108 via the centric outlet 104.

Filter systems of this kind, as shown in FIG. 1, are normally used as air and/or particle filters, in particular for internal combustion engines in the construction machinery and agricultural machinery sector. They are distinguished by great robustness and, due to the high filter load, have short service lives. At the same time, a filter system 100 with loaded filter element must tolerate an additional weight of 10 kg or more.

Figure 2:
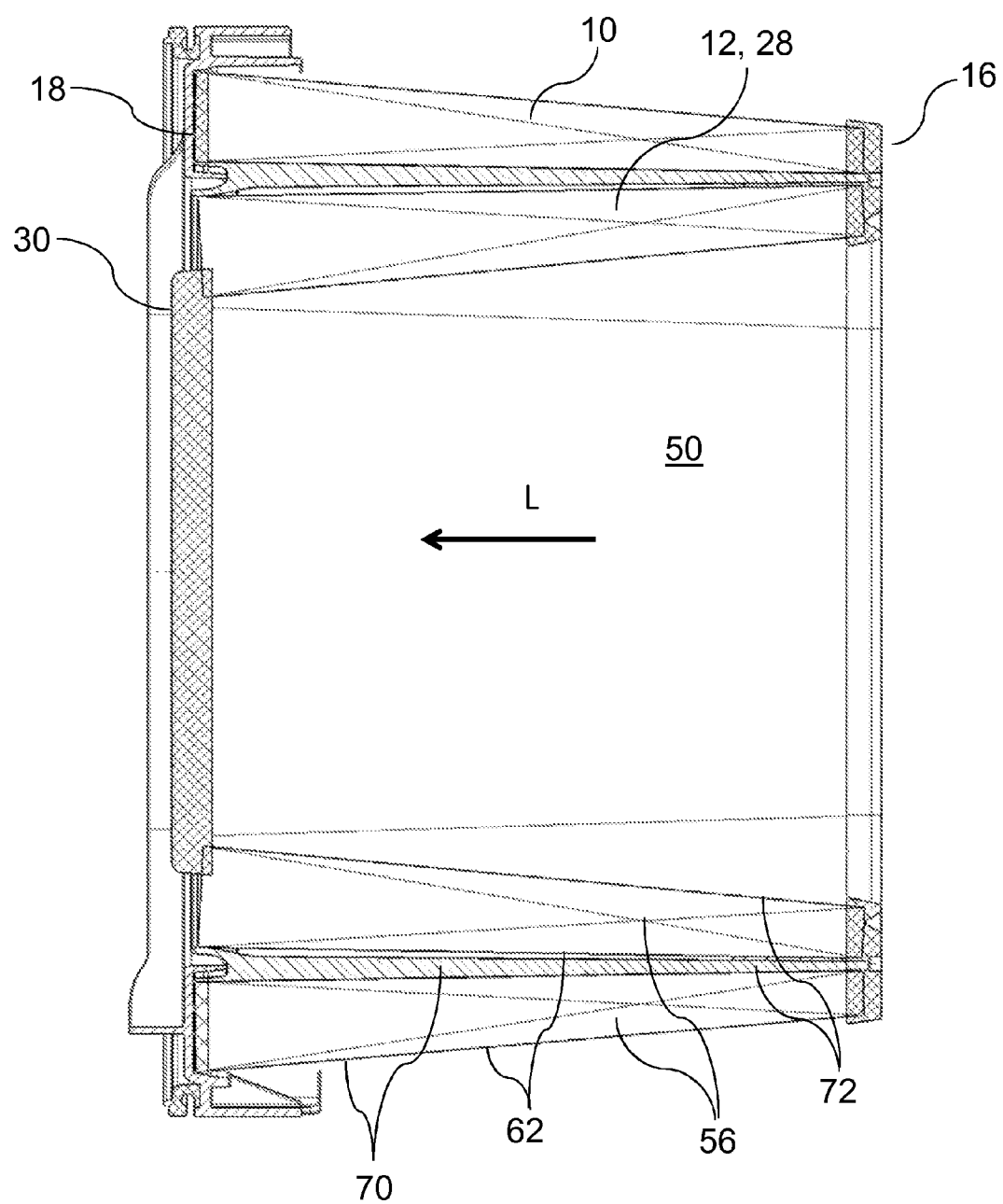
FIG. 2 shows a longitudinal section through a filter element with internal secondary element according to an exemplary embodiment of the invention, wherein the cone shapes of the semi-conical pleating point in the same direction in the longitudinal axis.

FIG. 2 shows a longitudinal section through a filter element 10 with inner secondary element 12, 28 according to an exemplary embodiment of the invention, wherein the cone shapes of the semi-conical pleating of the filter medium 56 point in the same direction in the longitudinal axis L. Shown in FIG. 2 is a filter element 10, in the interior 50 of which a second filter element 12, which, for example, is used as secondary element 28, is arranged. The filter element 10 is closed at both ends by a first and a second end disk 16, 18 which lend the filter element 10 stability and ensure sealing when installed in a housing 108 of a filter system 100. The secondary element 28 is closed at the top end by an end disk 30 and is open at the bottom end so that the filtered fluid can escape. The filter element 10 is arranged so that the inner pleat edges 72 of the pleats 62 of the filter medium 56 are positioned on the envelope surface of a cylinder, while the outer pleat edges 70 are positioned on the envelope surface of a cone, wherein the filter element 12 is arranged so that the inner pleat edges 72 of the pleats 62 of the filter medium 56 are positioned on the envelope surface of a cone, while the outer pleat edges 70 are positioned on the envelope surface of a cylinder. In this way, the two filter elements 10, 12 can be arranged as tightly as possible against one another, while the interior of the filter elements 10, 12 opens wide in the outlet direction in the opposite direction to the longitudinal axis L and thus allows a good flow rate for the filtered fluid.

Figure 3:
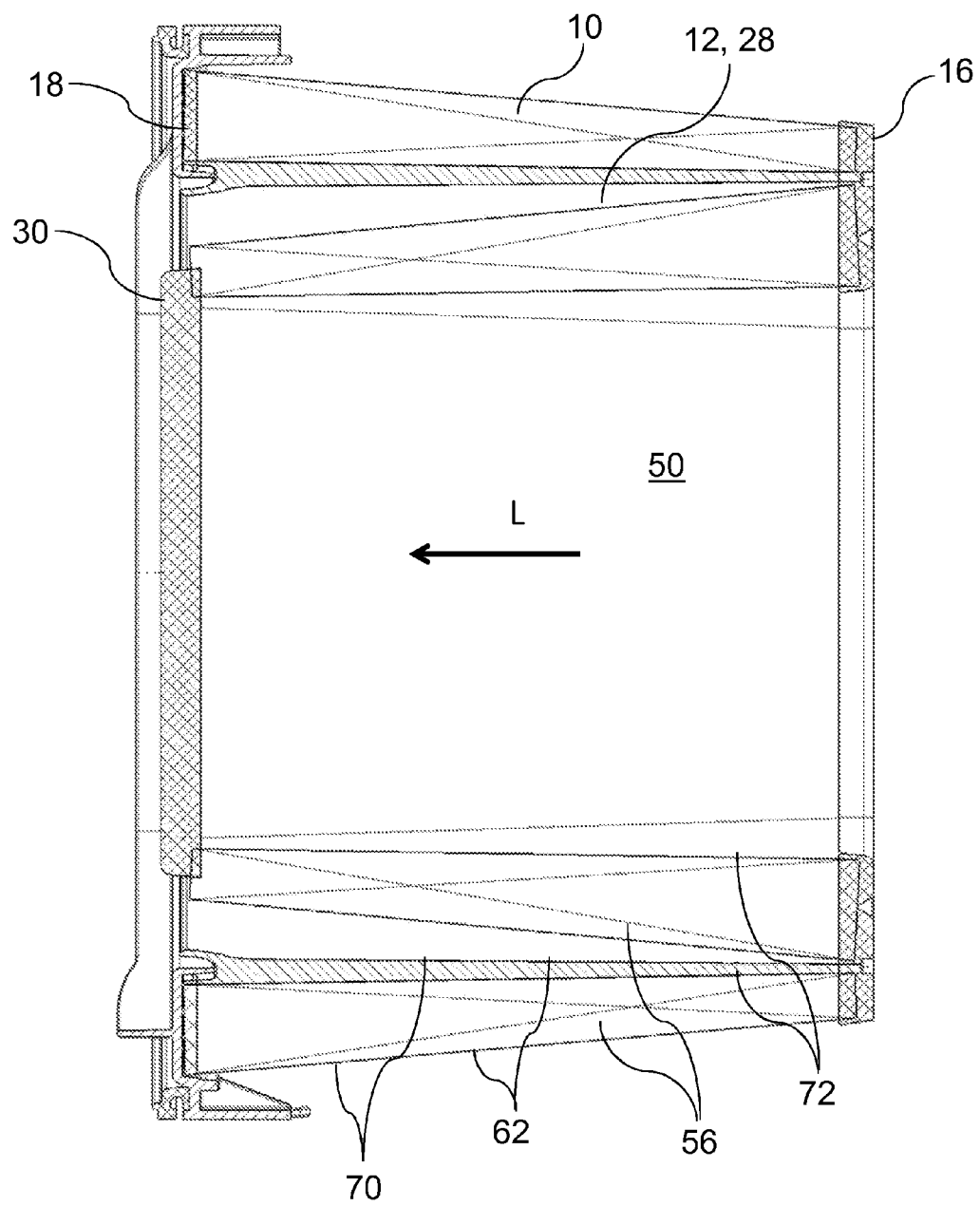
FIG. 3 shows a longitudinal section through a filter element with internal secondary element according to an exemplary embodiment of the invention, wherein the cone shapes of the semi-conical pleating point in the opposite direction in the longitudinal axis.

FIG. 3 shows a longitudinal section through a filter element 10 with inner secondary element 12, 28 according to an exemplary embodiment of the invention, wherein the cone shapes of the semi-conical pleating of the filter medium 56 point in the opposite direction in the longitudinal axis L. Shown in FIG. 3 is a filter element 10, in the interior 50 of which a second filter element 12, which, for example, is used as secondary element 28, is arranged. The filter element 10 is closed at both ends by a first and a second end disk 16, 18 which lend the filter element 10 stability and ensure sealing when installed in a housing 108 of a filter system 100. The secondary element 28 is closed at the top end by an end disk 30 and is open at the bottom end so that the filtered fluid can escape. The filter element 10 is arranged so that the inner pleat edges 72 of the pleats 62 of the filter medium 56 are positioned on the envelope surface of a cylinder, while the outer pleat edges 70 are positioned on the envelope surface of a cone, wherein the filter element 12 is arranged so that the inner pleat edges 72 of the pleats 62 of the filter medium 56 are positioned on the envelope surface of a cylinder, while the outer pleat edges 70 are positioned on the envelope surface of a cone. In this way, the interior 50 constitutes a cylindrical open region, so that the filter element 12 can, for example, be plugged onto a cylindrical supporting tube.

Figure 4:
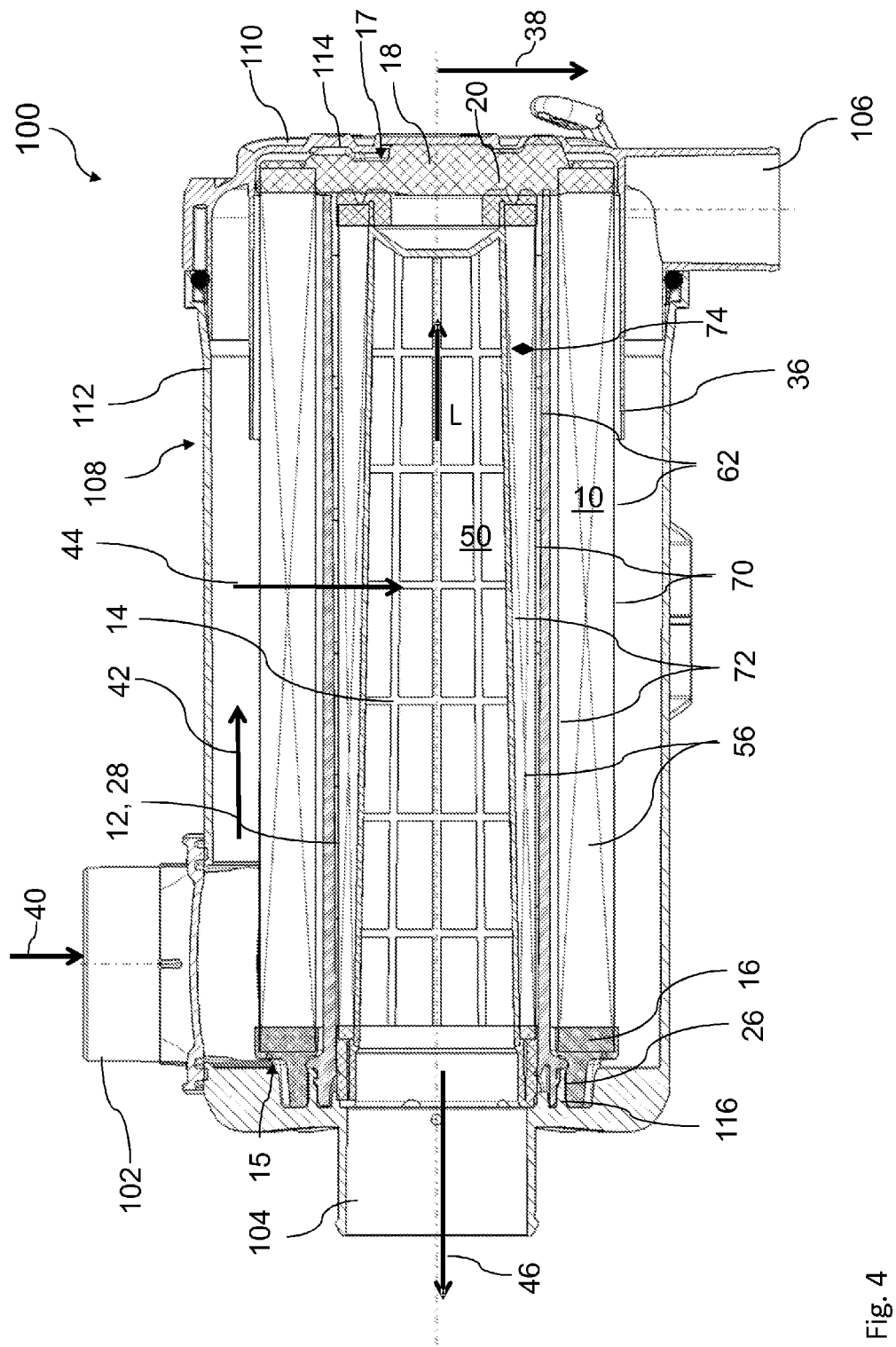
FIG. 4 shows a longitudinal section through a filter system according to an exemplary embodiment of the invention, in which the filter medium of the filter element has a straight pleating and an inner secondary element has a semi-conical pleating.

A longitudinal section through a filter system 100 according to an exemplary embodiment of the invention is shown in FIG. 4, in which the filter medium 56 of the filter element 10 has a straight pleat and an inner secondary element 28, as second filter element 12, has a semi-conical pleat. The housing 108 of the filter system 100, which comprises a housing wall 112, is closed at a face side by a cover 110. A filter element 10, which comprises a filter medium 56 arranged concentrically to a longitudinal axis L, is closed at two opposing face sides 15, 17 by a first and a second end disk 16, 18 which, for example, can be made of polyurethane foam or an elastomer. The filter medium 56, for example, can be pleated in a zigzag shape, designed to be closed in an annular shape and, for example, consist of paper or of cellulose or of a mixed fiber made of plastic and cellulose.

The second end disk 18 has supporting studs 20 which, when installed in the receiving housing 108, are supported both axially and radially on the housing 108 resting on an inner cover contour 114 of the cover 110. A radial seal 26, by means of which the filter element 10 is radially supported on the housing 108, is attached at the opposite face side 15 of the filter element 10 to the first end disk 16. The radial seal 26 seals by means of the sealing contour 116 the unfiltered against the filtered air chamber. The filter element 10 is therefore clamped axially as well as doubly radially against the housing 108.

Dust-laden air can flow in the direction of the arrow 40 through the inlet 102, which, in this case, is shown as a tangential inlet and, as a result of the rotational movement effected with the aid of the cyclone separator 36, enables a cyclone operation. Dust particles can be partially pre-separated by the rotational movement, deposited on the inner housing wall and, when the filter housing 108 is installed in a horizontal position, emptied downwards out of the filter system 100 through the dirt outlet 106 by gravitational force. In operation, after partial separation of the dust particles, the air flows through the filter medium 56 in the direction of the arrows 42, 44 into the interior 50 of the filter element. In doing so, depending on the filter medium, dust particles above a particular particle size remain suspended in the filter medium 56. Depending on the amount of dust entering, the filter element 10 must therefore be replaced after a certain service life.

The filtered air flows out in the direction of the arrow 46 via the outlet 104. The secondary element 28, which consists substantially of a supporting structure, the supporting tube 14 and a relatively permeable filter medium 56, which is shown pleated in a semi-conical manner in FIG. 4, is fitted in the interior 50 of the filter element 10, i.e., in the filtered air region, and remains in the housing 108 when replacing the filter element 10 to protect the downstream air routing, for example of an internal combustion engine, against penetrating dust particles and other objects. The secondary element 28 is attached to the outlet-side part of the housing 108 and sealed by means of a radial seal.

The cone of the semi-conical pleating of the secondary element 28 is arranged so that it opens in the opposite direction to the longitudinal direction L, i.e., in the outlet direction, in order to present a lowest possible flow resistance for the filtered fluid. The inner pleat edges 72 of the pleats 62 of the secondary element 28 are positioned on the envelope surface of a cone, while the outer pleat edges 70 are positioned on the envelope surface of a cylinder. The filter medium 56 of the filter element 10 has a straight pleating so that the inner and outer pleat edges 72, 70 of the pleats 62 are positioned on the envelope surfaces of a cylinder.

The advantage of the exemplary embodiment shown in FIG. 4 lies in that the outer contour of the secondary element 28 is cylindrical and can therefore be plugged onto a supporting tube 14 fixed to the housing. At the same time, for low requirements regarding degree of separation and pressure loss, a secondary element 28, equipped with fleece, can still be provided in the same housing as an option.

As a result of the semi-conical design, a larger filter area compared with a straight pleating with the same pleat height 74 (on the outlet side) can be provided on the secondary element 28 by using a possible smaller pleat pitch. The larger filter area also applies compared to the fleece medium which cannot be pleated at all for such a small height and therefore only forms the cylinder surface of the outer contour.

Together with the outlet cross section on the outlet side, which is still large, the large filter area then offers the advantage of a very small pressure loss.

Figure 5:
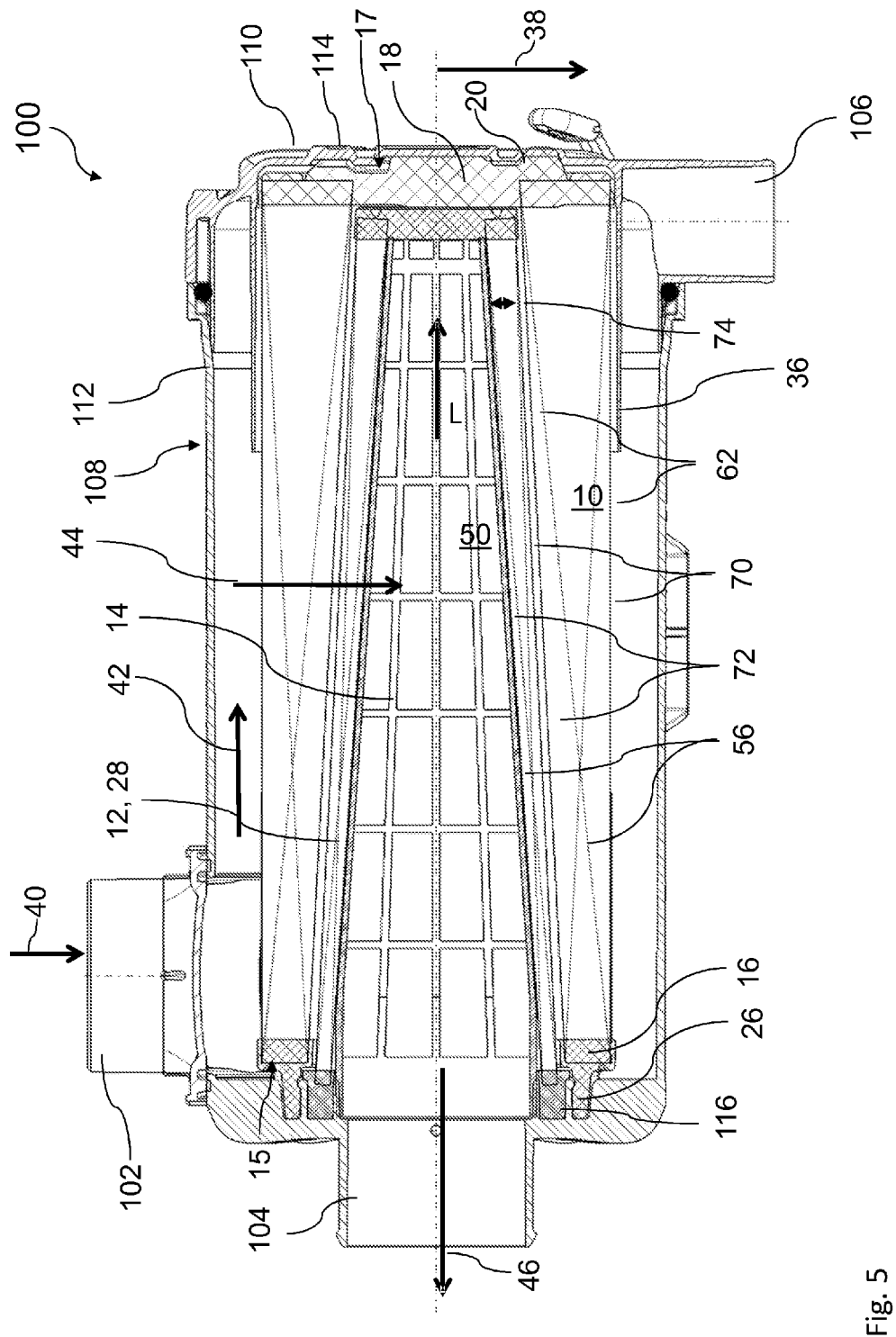
FIG. 5 shows a longitudinal section through a filter system according to an exemplary embodiment of the invention, in which the filter medium of the filter element and the inner secondary element have a semi-conical pleating which points in the same direction in the longitudinal axis.

FIG. 5 shows a longitudinal section through a filter system 100 according to an exemplary embodiment of the invention, in which the filter medium 56 of the filter element 10 and the inner secondary element 28 have a semi-conical pleat which point in the same direction in the longitudinal axis L.

The cone of the semi-conical pleat of the secondary element 28 is arranged so that it opens in the opposite direction to the longitudinal direction L, i.e., in the outlet direction, in order to present a smallest possible flow angle for the filtered fluid. Both the inner pleat edges 72 of the pleats 62 of the secondary element 28 and the outer pleat edges 70 are positioned on the envelope surfaces of two cone shapes. The secondary element 28 is attached to a likewise conical supporting tube 14. The filter medium 56 of the filter element 10 likewise has a semi-conical pleat, with which the inner pleat edges 72 are positioned on the envelope surface of a cone and the outer pleat edges 70 of the pleats 62 are positioned on the envelope surfaces of a cylinder. As the cone shapes of the secondary element 28, like the cone shape of the filter element 10, are open in the opposite direction to the longitudinal axis L, i.e., in the outlet direction, a densest possible packing of filter element 10 and secondary element 28 is possible so that the interior 50 of the filter element 10 can open as widely as possible towards the outlet 104 and thus present a lowest possible flow resistance to the filtered fluid.

The advantage of the exemplary embodiment shown in FIG. 5 lies in that, due to this arrangement in the interior 50, the cone shape is now even more strongly pronounced, which further optimizes the flow routing and therefore the pressure loss.

As a result of the semi-conical pleating of the filter medium 56, a larger filter area compared with a straight pleating with the same pleat height 74 (on the outlet side) can be provided on the secondary element 28 by using a possible smaller pleat pitch. The larger filter area also applies to the comparison with the fleece medium which cannot be pleated at all in this small height and therefore only forms the cylinder surface of the outer contour.

Together with the outlet cross section on the seal side, which is still large, the large filter area then offers the advantage of a very small pressure loss.

On the one hand, the filter element 10, which is equipped with semi-conical pleating, now offers the possibility of opening the outlet cross section wider on the outlet side by reducing the pleat height 74 on this side (positive for the pressure loss), and, on the other hand, has no loss of filter area, as the pleat height 74 on the closed side is twice as large. In addition, the specific dust loading (dust mass per filter area) of the filter element is improved, as large quantities of dust can be accommodated due to the large intermediate spaces in the pockets of the pleats 62.

Figure 6:
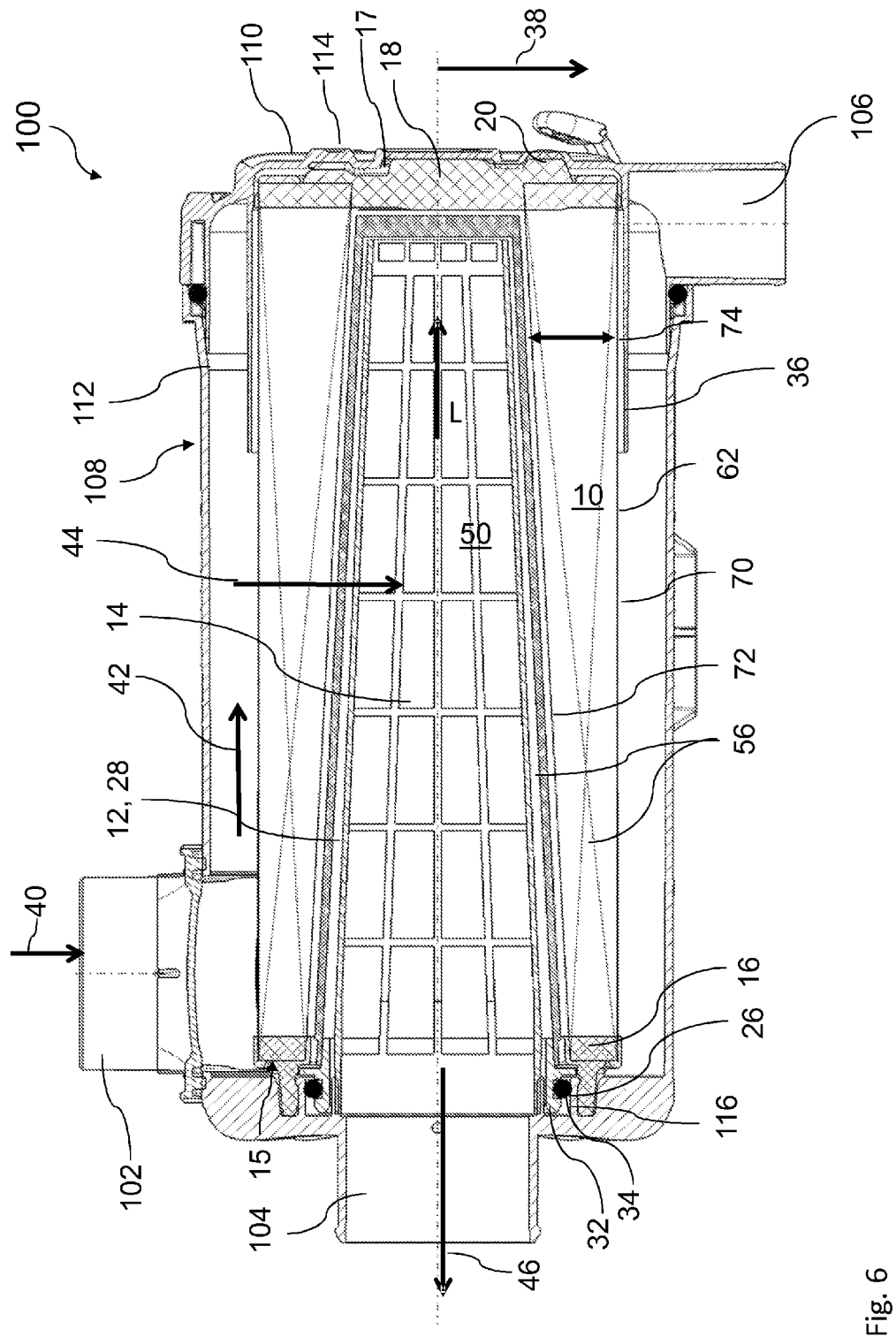
FIG. 6 shows a longitudinal section through a filter system according to an exemplary embodiment of the invention, in which the filter medium of the filter element has a semi-conical pleating and the filter medium of the secondary element consists of a fleece.

A longitudinal section through a filter system 100 according to an exemplary embodiment of the invention, in which the filter medium 56 of the filter element 10 has a semi-conical pleat and the filter medium 56 of the secondary element 28 consists of a fleece, is shown in FIG. 6. The filter medium 56 of the filter element 10 has a semi-conical pleat, where the inner pleat edges 72 are positioned on the envelope surface of a cone and the outer pleat edges 70 of the pleats 62 are positioned on the envelope surfaces of a cylinder. The secondary element 28 is matched to the conical shape of the inner pleat edges 72 of the filter element 10 and comprises a fleece which is attached to a conical supporting tube 14.

The cone shape of the filter medium 56 in the form of a fleece as secondary element 28 enables a large outlet opening and a larger filter area in comparison to a comparable straight secondary element 28 with a smaller diameter made from a fleece.

The secondary element 28 therefore requires no central tube of its own made of plastic or metal and can therefore be produced more cost effectively. A plastic ring 32, to which the fleece is attached and on which an O-ring seal 34 is provided, is expedient for stiffening.

Alternatively, a simple star-pleated filter bellows in conical form which is matched to the inner side of the filter element 10 and which preferably has a constant pleat height which is small compared with the filter element 10, for example less than or equal to 10 mm, preferably less than or equal to 5 mm, can be used instead of a fleece.

On the one hand, the filter element 10, which is equipped with semi-conical pleating, now offers the possibility of opening the outlet cross section wider on the outlet side by reducing the pleat height 74 on this side (positive for the pressure loss), and, on the other hand, has no loss of filter area, as the pleat height 74 on the closed side is twice as large. In addition, the specific dust loading (dust mass per filter area) of the filter element is improved, as large quantities of dust can be accommodated due to the large intermediate spaces in the pockets of the pleats 62.

Figure 7:
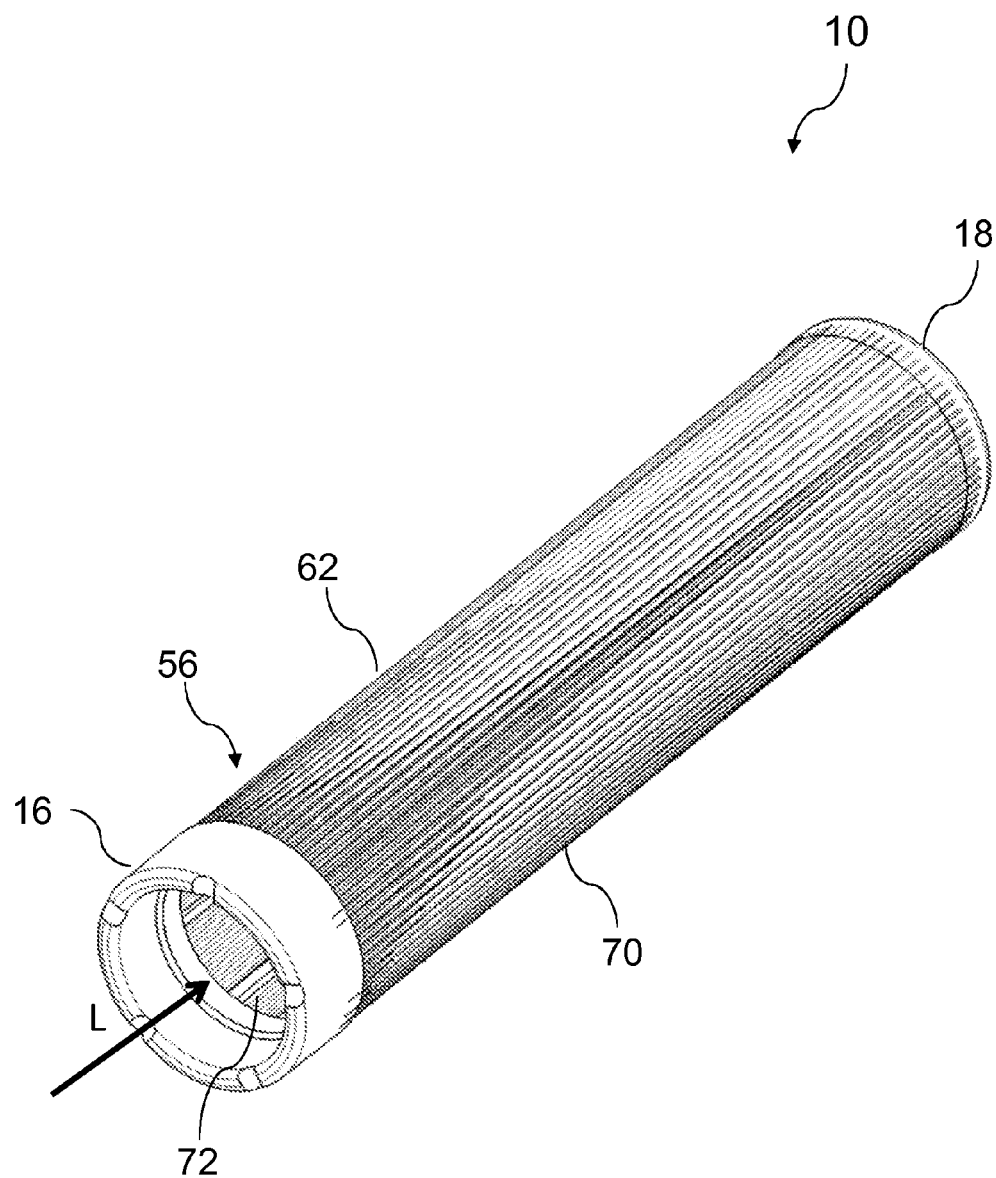
FIG. 7 shows a filter element according to an exemplary embodiment of the invention with semi-conical pleating of the filter medium.

FIG. 7 shows a filter element 10 according to an exemplary embodiment of the invention with semi-conical pleating of the filter medium 56. The filter element 10 is closed at both ends by a first and a second end disk 16, 18 which are used to provide stability for the filter element 10 and for sealing when installed in the housing 108 of a filter system 100. The filter medium 56 has a semi-conical pleating in such a way that the outer pleat edges 70 of the pleats 62 are positioned on the envelope surface of a cylinder and the inner pleat edges 72 are positioned on the envelope surface of a cone.

Figure 8:
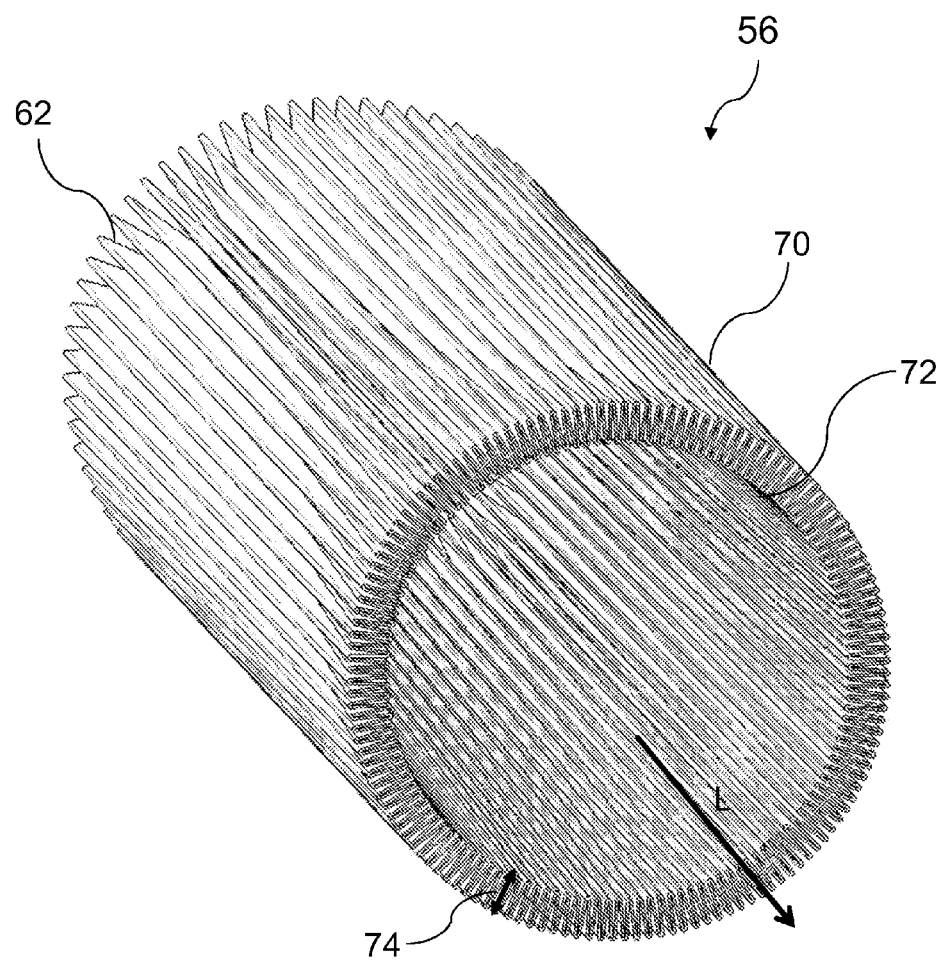
FIG. 8 shows a filter medium according to an exemplary embodiment of the invention with semi-conical pleating of the filter medium.

FIG. 8 further shows a filter medium 56 according to an exemplary embodiment of the invention with semi-conical pleating of the filter medium 56. The outer pleat edges 70 of the pleats 62 of the filter medium 56 are positioned on the envelope surface of a cylinder and the inner pleat edges 72 are positioned on the envelope surface of a cone. It can be seen in FIG. 8 that the pleats 62 become closer in the longitudinal direction L, while the pleat height 74 continuously decreases in the longitudinal direction L so that the cone consequently opens in the longitudinal direction L. The filter medium 56 therefore has a variable flow resistance along the longitudinal axis L, wherein, in the exemplary embodiment shown, it increases on the outside while it decreases on the inside along the longitudinal axis L due to the opening internal cross section.

While specific embodiments of the invention have been shown and described in detail to illustrate the inventive principles, it will be understood that the invention may be embodied otherwise without departing from such principles.

What is claimed is:

1. A filter system comprising:
   a housing with a housing wall and a cover;
   an inlet arranged on the housing and adapted to feed a fluid to be filtered into the housing;
   an outlet arranged on the housing and adapted to discharge the filtered fluid;
   one or more filter elements arranged in the housing, wherein the filter elements each comprise at least one filter medium, wherein at least one of the filter elements extends along a longitudinal axis;
   wherein the filter medium is pleated in a zigzag shape and has a first side and a second side opposite the first side, wherein the filter medium comprises pleats extending in a direction of the longitudinal axis, wherein the pleats comprise outer pleat edges and inner pleat edges, wherein the outer pleat edges are positioned on the first side of the filter medium and wherein the inner pleat edges are positioned on the second side of the filter medium and are positioned opposite the outer pleat edges;

wherein the filter medium has a variable flow resistance along the longitudinal axis, wherein a first one and a second one of the filter elements are provided and wherein said first one of the filter elements is arranged in an interior of said second one of the filter elements.

2. The filter system as claimed in claim 1, wherein the outer pleat edges are positioned on an envelope surface of a cylinder and the inner pleat edges are positioned at least partially on an envelope surface of a cone.

3. The filter system as claimed in claim 1, wherein the outer pleat edges are positioned at least partially on an envelope surface of a cone and the inner pleat edges are positioned on an envelope surface of a cylinder.

4. The filter system as claimed in claim 1, wherein the outer pleat edges and the inner pleat edges are positioned at least partially on an envelope surface of a cone.

5. The filter system as claimed in claim 1, wherein a pleat height of the pleats changes continuously along the longitudinal axis.

6. The filter system as claimed in claim 1, wherein the inner or outer pleat edges of said first filter element are positioned on an envelope surface of a first cone and wherein the inner or outer pleat edges of said second filter element are positioned on an envelope surface of a second cone, wherein the first and second cones are oriented in the same direction along the longitudinal axis.

7. The filter system as claimed in claim 1, wherein the inner or outer pleat edges of said first filter element are positioned on an envelope surface of a first cone and wherein the inner or outer pleat edges of said second filter element are positioned on an envelope surface of a second cone, wherein the first and second cones are oriented in opposite directions along the longitudinal axis.

8. The filter system as claimed in claim 1, wherein said first one of the filter elements is arranged as a secondary element in the interior of said second one of the filter element.

9. The filter system as claimed in claim 8, comprising a supporting tube arranged in the interior of the secondary element.

10. The filter system as claimed in claim 8, wherein the filter medium of the secondary element is comprised of a fleece.

11. The filter system as claimed in claim 8, wherein the secondary element is connected to the housing and remains in the housing when changing the filter element.

12. The filter system as claimed in claim 1, wherein at least one of the filter elements is arranged in the housing so as to be replaceable.

13. The filter system as claimed in claim 1 embodied as an air filter.

14. The filter system as claimed in claim 1 embodied as an air filter of an internal combustion engine.

15. The filter system as claimed in claim 1 embodied as a particle filter.

16. The filter system as claimed in claim 1 embodied as a particle filter of an internal combustion engine.

17. A filter system, comprising:

a first stage filter element and a second stage filter element, the first and the second stage filter elements each comprising:

a filter medium;

wherein the filter medium is folded in a zigzag shape into a plurality of pleats, each filter medium pleat having an inner pleat edge and an outer pleat edge, wherein the pleat edges extend in a longitudinal direction;

wherein a pleat height is a radial distance from the inner pleat edge to the outer pleat edge of a respective filter medium pleat;

wherein the filter medium pleat has a pleat height that varies across the filter medium from a first longitudinal end of the filter medium to a second longitudinal end of the filter medium;

wherein the pleat height is greater at the first longitudinal end of the filter medium than at the second longitudinal end of the filter medium;

wherein either one of the inner pleat edges or the outer pleat edges are arranged on an envelope surface of a cone encircling the longitudinal axis such that the filter medium has semi-conical pleating;

wherein the outer pleat edges are positioned on the first side of the filter medium, and wherein the inner pleat edges are positioned on the second side of the filter medium and are positioned opposite the outer pleat edges; and wherein the filter medium has a variable flow resistance along the longitudinal axis provided by the varying pleat height;

wherein the first stage filter element encircles and is circumferentially closed about an exterior of the second stage filter such that the first stage filter element is connected to the second stage filter element;

wherein the first stage filter element has a first facing envelope surface of the inner pleat edges having a surface configuration that is either conical or cylindrical; and wherein the envelope surface of the outer pleat edges of the second stage filter element has: a second surface configuration that is conical if the first surface configuration is conical, or cylindrical if the first surface configuration is cylindrical.

18. The filter system as claimed in claim 17, wherein the filter medium is annularly closed.

19. The filter system as claimed in claim 17, wherein the filter medium is comprised of paper or of cellulose or of a mixed fiber made of plastic and cellulose.

* * * * *